(12) United States Patent
Tsai et al.

(10) Patent No.: US 7,403,512 B2
(45) Date of Patent: Jul. 22, 2008

(54) SERVICE DISCOVERY ARCHITECTURE AND METHOD FOR WIRELESS NETWORKS

(75) Inventors: Jr-Shian Tsai, Beaverton, OR (US); Changwen Liu, Portland, OR (US); Hani Elgebaly, Beaverton, OR (US); James P. Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 871 days.

(21) Appl. No.: 10/685,111

(22) Filed: Oct. 14, 2003

(65) Prior Publication Data

US 2005/0078644 A1    Apr. 14, 2005

(51) Int. Cl.
*H04Q 7/24* (2006.01)
(52) U.S. Cl. ................... 370/338; 370/908
(58) Field of Classification Search ........... 370/310, 370/328, 338, 908; 709/200, 221; 455/41.1, 455/41.2, 41.3
See application file for complete search history.

(56) References Cited

U.S. PATENT DOCUMENTS

2002/0089959 A1*  7/2002  Fischer et al. ............ 370/338
2003/0013477 A1    1/2003  McAlinden
2003/0027525 A1    2/2003  Moore et al.
2003/0095524 A1*  5/2003  Stephens et al. .......... 370/338
2003/0217168 A1   11/2003  Adachi et al.
2004/0199616 A1*  10/2004  Karhu ..................... 709/221

FOREIGN PATENT DOCUMENTS

| EP | 1022876 A1 | 7/2000 |
|---|---|---|
| EP | 1435721 A2 | 7/2004 |
| JP | 2003-289306 | 10/2003 |
| WO | WO-05039118 A3 | 4/2005 |
| WO | WO-2005039118 A2 | 4/2005 |

OTHER PUBLICATIONS

"Partial PCT Search Report/Invitation to Pay Additional Fees", PCT/US2004/033067, (Mar. 31, 2005), 5 pages.

Bettstetter, C., et al., "A Comparision of Service Discovery Protocols and Implementation of the Service Location Protocol", *Institute of Communication Networks*, (Sep. 13, 2000), 1-8.

Czerwinski, S. E., et al., "An Architecture for a Secure Service Discovery Service", *Mobicom'99, Proceeding of the 5th Annual ACM/IEEE Intn. Conferernce on Mobile Computing & Networking*, (Aug. 15, 1999), 24-35.

* cited by examiner

*Primary Examiner*—Quochien B. Vuong
(74) *Attorney, Agent, or Firm*—The Law Offices of John C. Scott, LLC; John C. Scott

(57) ABSTRACT

Techniques and structures are disclosed for providing service related information to wireless users within a wireless network.

21 Claims, 5 Drawing Sheets

SERVICE DISCOVERY ARCHITECTURE AND METHOD FOR WIRELESS NETWORKS

FIELD OF THE INVENTION

The invention relates generally to wireless communications and, more particularly, to wireless networks.

BACKGROUND OF THE INVENTION

Wireless networks often make various services available to wireless users in the network. Before taking advantage of such services, however, users need to be made aware of the availability of the services. Techniques and structures are therefore desirable for apprising wireless users of the availability of network services.

DETAILED DESCRIPTION

Figure 1:
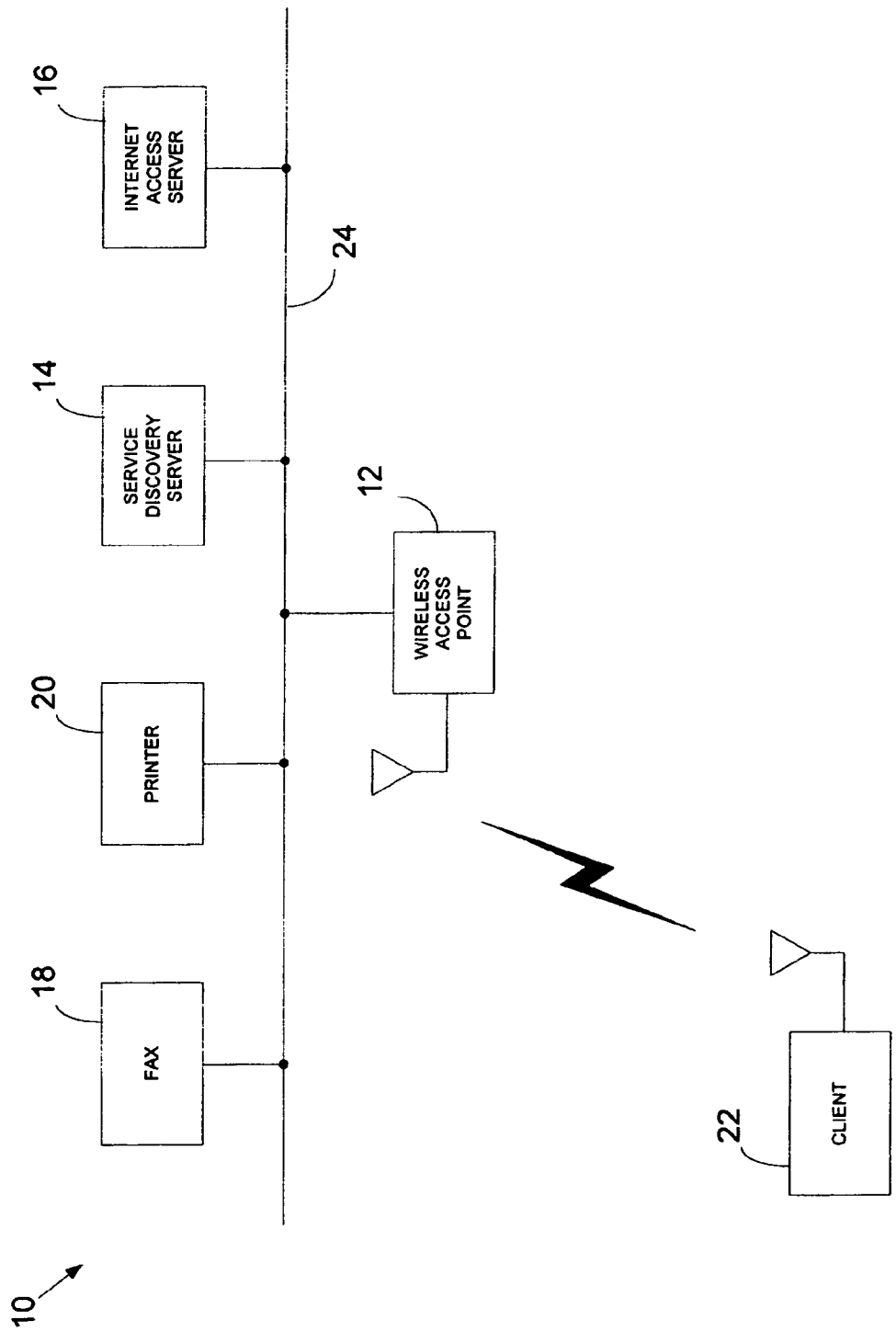
FIG. 1 is a block diagram illustrating an example wireless network in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example network 10 in accordance with an embodiment of the present invention. As illustrated, the network 10 may include one or more of: a wireless access point 12, a service discovery server 14, an internet access server 16, a fax machine 18, a printer 20, and a wireless client device 22. The wireless access point 12, service discovery server 14, internet access server 16, fax machine 18, and printer 20 may each be connected to a network medium 24. Any form of network medium may be used (e.g., wired or wireless). The wireless access point 12 provides wireless access to the network 10 for the wireless client device 22. The wireless access point 12 may be capable of providing simultaneous access to the network 10 for multiple wireless client devices. In at least one embodiment of the invention, the wireless access point 12 and the wireless client device 22 may each operate in accordance with one or more wireless networking standards including, for example, IEEE 802.11, ANSI/IEEE Std 802.11-1999 Edition; IEEE 802.11a, IEEE Std 802.11a-1999; IEEE 802.11b, IEEE Std 802.11b-1999; IEEE 802.11g, IEEE Std 802.11g-2003; HiperLAN Type 1, TR 101 764, EN 300 652, ETS 300 836-1, ETS 300 836-2, ETS 300 836-3, ETS 300 836-4, ETS 300 652/A2, ETS 300 826, ETS 300 652, ETR 069 developed by the European Telecommunications Standards Institute (ETSI); HiperLAN Type 2, TS 101-475, 761-1, 761-2, 493-1, 493-2, 763-1, 763-2, developed by ETSI; HomeRF, HomeRF Specification, Revision 2.01, The HomeRF Technical Committee, July, 2002; Bluetooth, Specification of the Bluetooth System, Version 1.1, Bluetooth SIG, Inc., February 2001, Ultra Wideband, and/or others. The wireless client device 22 may include any type of wireless device that can be used to wirelessly access a network including, for example, a laptop, desktop, palmtop, or tablet computer having wireless network interface functionality (e.g., a network interface card (NIC), etc.), a personal digital assistant (PDA) having wireless capability, a cellular telephone or other handheld wireless communicator, a pager, and/or others.

The network 10 may have a number of services that are available to wireless users. For example, facsimile services may be available to users through the fax machine 18, printer services may be available to users via printer 20, Internet access services may be available to users through the Internet access server 16, and so on. Many other (or alternative) services may also be available to users such as, for example, copy services, commercial ad broadcasting services (e.g., a coffee special from Starbucks®, etc.), location-based services (e.g., nearest Italian restaurant, local-time synchronization with the client's clock, etc.), internal enterprise information technology (IT) services, FYI channel, streaming nearby wireless network information such as access points to assist faster roaming, and/or others. The service discovery server 14 is operative for discovering services that are available within the network 10. This may include, for example, the discovery of the actual types of services that are available (e.g., printing, Internet access, etc.). In addition, other information may also be discovered about available services including, for example, cost information, provider information, bandwidth information, device capability information, and/or other types of information. An example of one possible type of service discovery server 14 would be a server that implements the universal plug and play (UPnP) protocol, although other server types may alternatively be used (e.g., servers using the service location protocol (SLP) of the Internet Engineering Task Force (IETF), proprietary service discovery protocols and applications, and/or others). In at least one embodiment of the invention, multiple service discovery servers are present within a network. In other embodiments, the network does not include a dedicated service discovery server. Instead, each of the devices and services within the network are universal plug and play (UPnP) compatible and the wireless access point uses UPnP to discover the available services within the network.

The service discovery server 14 may deliver information relating to discovered services to the wireless access point 12. The wireless access point 12 may then transmit some or all of the received service information to the wireless client device 22. The wireless client device 22 may then use the information to apprise a user of the services that are available in the network 10. The service discovery server 14 may deliver service information to the wireless access point 30 automatically or in response to a request (from, for example, the wireless access point 30, the wireless client device 22, or another source). In at least one implementation, the service discovery server 14 describes services using the extensible markup language (XML), although other techniques may alternatively be used. In addition, further techniques, such as data compression, may be applied to facilitate efficient utilization of network bandwidth.

In at least one embodiment of the invention, the wireless access point 12 changes the format of the service information received from the service discovery server 14 before transmitting the information to the wireless client device 22. For example, in one approach, the wireless access point 12 includes a controller having a service abstraction unit that parses the services information received from a service discovery server and stores the parsed information within a corresponding memory (the service abstraction unit may alternatively be located somewhere else within the network). A services signal having a predetermined format may then be generated for delivery to the wireless client device 22 using the contents of the memory. Other techniques may alternatively be used. In at least one embodiment, the wireless access point 12 simply relays the service information received from a service discovery server 14 to the wireless client device 22 without changing the format thereof.

The wireless access point 12 may transmit a services signal to the client device 22 in any of a variety of ways. In one possible approach, for example, a broadcast signal containing the service information is transmitted from the wireless access point 12 to all wireless client devices within a coverage area thereof. In another possible approach, a services signal may be transmitted to a particular wireless client device 22 without being broadcast to other devices. Other techniques are also possible. The wireless access point 12 may transmit the services signal to the wireless client device automatically (e.g., at periodic intervals, at predetermined times, as part of a beacon signal, etc.), in response to a request received from the wireless client device 22, or in other manners. Although the wireless access point 12 and the service discovery server 14 are illustrated as separate entities in FIG. 1, it should be appreciated that these units may be part of a single structure within a network (e.g., the service discovery server 14 may be part of the wireless access point 12, etc.).

Figure 2:
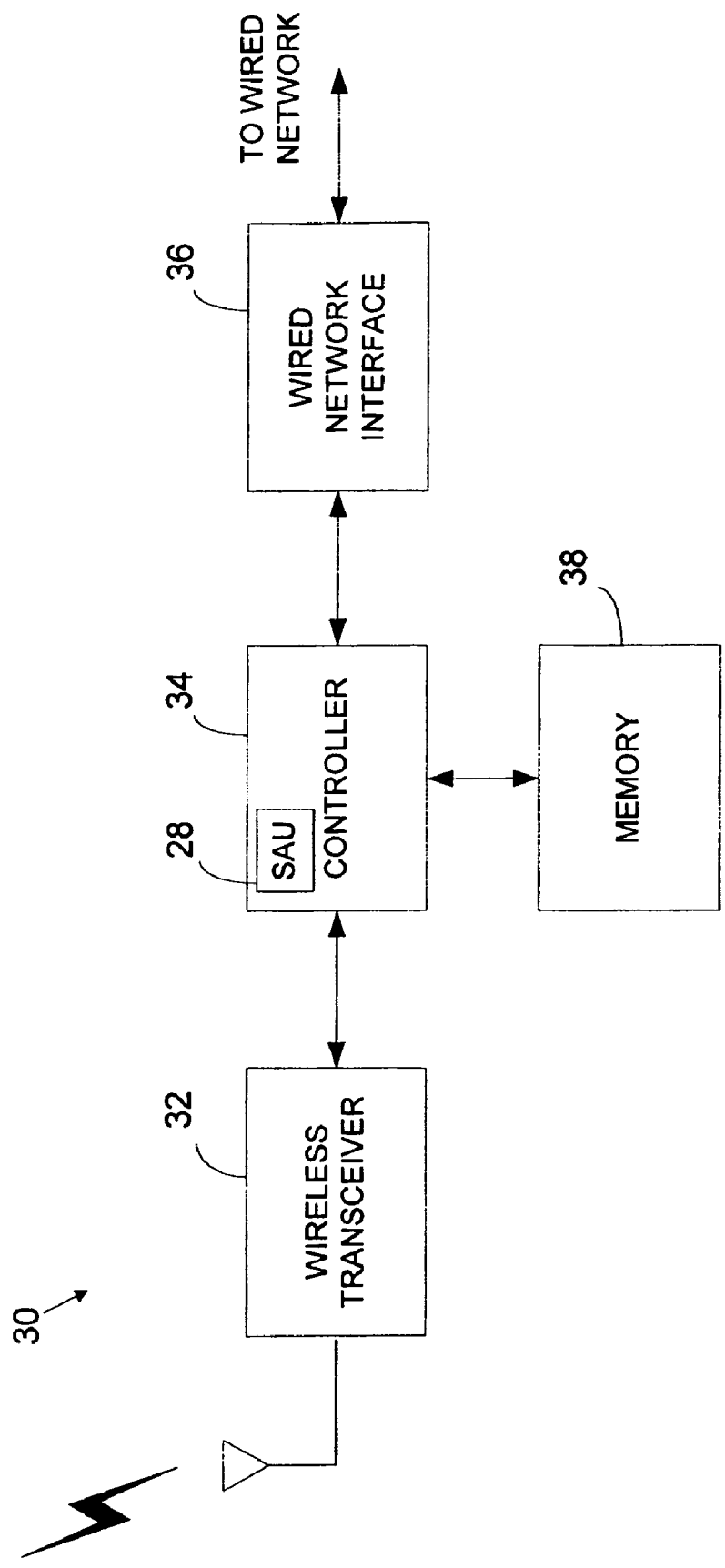
FIG. 2 is a block diagram illustrating an example wireless access point in accordance with an embodiment of the present invention.

FIG. 2 is a block diagram illustrating an example wireless access point 30 in accordance with an embodiment of the present invention. As illustrated, the wireless access point 30 may include one or more of: a wireless transceiver 32, a controller 34, a wired network interface unit 36, and a memory 38. The wireless transceiver 32 is operative for supporting wireless communication with one or more remote wireless client devices. The wired network interface unit 36 is operative for supporting communication on a wired network medium. The controller 34 is operative for controlling the operation of the wireless access point 30 and may include, for example, one or more digital processing devices that are capable of executing programs. The memory 38 is a digital storage device that may be used by the controller 34 to store, for example, digital information. Any form of digital storage device or structure may be used including, for example, semiconductor memories, disk storage devices, and/or others.

During operation of the access point 30, the controller 34 may receive service information from one or more service discovery servers within an associated network (through, for example, the wired network interface unit 36) that describes services that are available within the network. The controller 34 may store the service information within the memory 38 and subsequently use the information to generate a services signal for transmission to one or more wireless client devices via wireless transceiver 32. In at least one embodiment of the present invention, the controller 34 includes a service abstraction unit (SAU) 28 to parse the service information received from the service discovery server(s) and to store or cache the parsed information within the memory 38 in a predetermined format. In one approach, the services signal is transmitted as part of a beacon signal that is periodically broadcast to all of the wireless client devices within a coverage area of the wireless access point 30. In another approach, the controller 34 may generate and send a services signal to a particular wireless client device in response to a request received from the device. Other techniques may alternatively be used. In other embodiments, the controller 34 may pass any service related information received from a service discovery server directly through to one or more wireless client devices without changing the data format of the services information. As will be described in greater detail, in at least one embodiment of the invention, a services signal is transmitted by a wireless access point in a format that is readable within the data link layer so that the signal may be detected by a wireless client device that is operating within, for example, a power save mode.

As described above, in at least one embodiment of the invention, a service abstraction unit is included within a network. The service abstraction unit may provide a framework to discover devices and/or services based on innovative technologies such as universal plug and play (UPnP™), smart personal object technology (SPOT), Jini network technology, LoCation Service (LCS), service location protocol (SLP), and/or others. The service abstraction unit may provide interfaces to service descriptor plug-ins to register and send service information to the unit. A medium access control (MAC) plug-in may register and receive service information and send it to any wireless station. The service abstraction unit is a generic framework to collect various devices and services in the network. The service abstraction unit may interact with service discovery plug-ins to collect all service information and send this information using MAC plug-ins to wireless stations. The MAC plug-in may work with an access point stack or any wireless stack to send this service information to wireless stations. Service vendors can develop plug-ins and then provide services to users.

Figure 3:
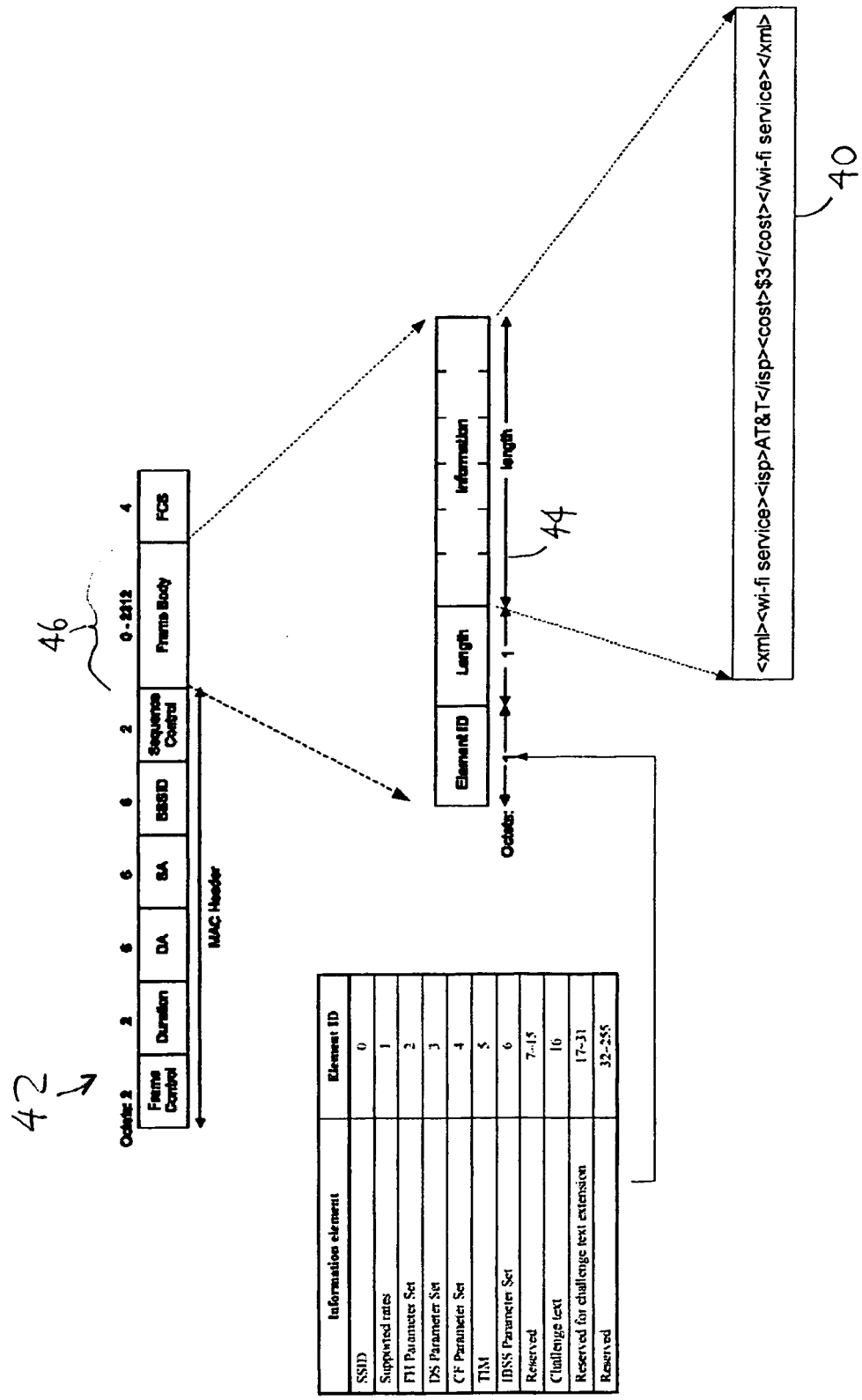
FIG. 3 is a diagram illustrating an example services signal that may be transmitted to wireless users in accordance with an embodiment of the present invention.

FIG. 3 is a diagram illustrating an example services signal 40 in accordance with an embodiment of the present invention. As shown, the services signal 40 is transmitted as part of a beacon signal 42 in a wireless network implementing the IEEE 802.11 wireless networking standard. In the illustrated embodiment, the service information is included within the information field 44 of the frame body 46 of the beacon signal 42 using one or more information elements. One or more of the reserved information element ID numbers (e.g., numbers 32-255) may be used to identify the services information within the frame body 46. In at least one embodiment, the extensible markup language (XML) is used to describe available services within the information field 44 of the frame body 46, although other description techniques may alternatively be used. In FIG. 3, the services signal 40 within the information field 44 includes an information element identifying a wireless fidelity (Wi-Fi) wireless local area network (WLAN) service that is available within the associated network that is provided by AT&T and that costs $3 per hour to use. Service descriptors for any number of services may be included in this manner. Also, any number of different service attributes may be described for a particular service.

In addition to service descriptors, in at least one embodiment of the present invention, one or more of the remaining reserved information element ID numbers within a beacon frame may be used to identify an advertising interval to client devices within a network. That is, a frame may be used to indicate to client devices the frequency of the advertisement of a particular service within the network. In at least one approach, it may be up to the individual clients whether to process the service descriptors within a frame or not. It should be appreciated that the services signal illustrated in FIG. 3 is merely an example of one form of services signal that may be transmitted by a wireless access point in accordance with the present invention. Many other signal formats may alternatively be used to deliver services information to wireless client devices.

Many wireless client devices have one or more power save modes that allow the device to reduce power consumption during periods of inactivity. Such devices typically reduce power consumption by turning off or reducing the voltage level of one or more components within the device. For example, the main digital processor within a device may be deactivated during a power save mode so that the operating system of the device is unavailable. Even though a device is in power save mode, a user of the device may still like to know what services are available in a local wireless network. The user may wish to know about available services, for example, to make a decision about whether or not to fully activate the client device to take advantage of one or more of the services. In at least one embodiment of the present invention, therefore, structures and techniques are provided for delivering information about available services to a client device within a wireless network while the client device is within a power save or low power operating mode.

Figure 4:
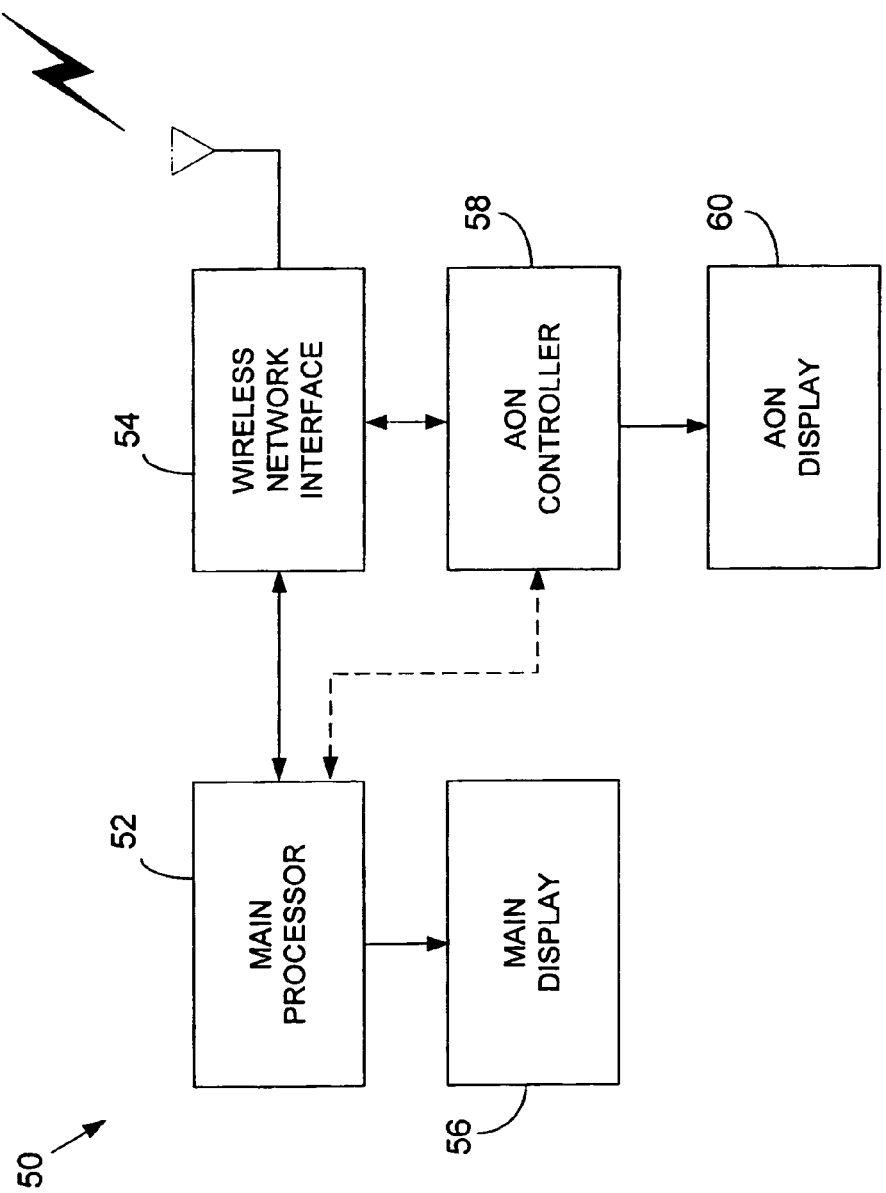
FIG. 4 is a block diagram illustrating an example wireless client device in accordance with an embodiment of the present invention.

FIG. 4 is a block diagram illustrating an example wireless client device 50 in accordance with an embodiment of the present invention. The wireless client device 50 may be used, for example, within the network 10 of FIG. 1 or within other networks. The wireless client device 50 may include any type of wireless device or system that can be used to wirelessly access a network including, for example, a laptop, desktop, palmtop, or tablet computer having wireless network interface functionality, a personal digital assistant (PDA) having wireless capability, a cellular telephone or other handheld wireless communicator, a pager, and/or others. As illustrated, the wireless client device 50 may include one or more of: a main processor 52, a wireless network interface unit 54, a main display 56, an always-on (AON) controller 58, and an AON display 60. The main processor 52 is a digital processing device that may execute the operating system of the wireless client device 50 and may also execute one or more application programs and/or other software routines, drivers, etc. The main display 56 is the display utilized by a user of the device 50 during normal (non-power save) modes of device operation (such as, for example, the main liquid crystal display of a laptop computer, etc.). The wireless network interface unit 54 supports wireless communication between the wireless client device 50 and a remote wireless network access point or gateway. The wireless network interface unit 54 may include, for example, a wireless network interface card (NIC) or other wireless transceiver unit. The wireless network interface unit 54 may operate in accordance with one or more wireless networking standards including, for example, IEEE 802.11a, b, g; HiperLAN Type 1 and Type 2; HomeRF; Bluetooth; Ultra Wideband; cellular; and/or others.

During a power save mode, the main processor 52, the main display 56, and/or other components within the wireless client device 50 may be powered down to save energy and/or prolong battery life. When the main processor 52 is powered down, the operating system of the device 50 will not typically be available to receive information about an associated wireless network. The AON controller 58 is a component within the wireless client device 50 that is still active even when the device 50 is in a power save mode. The AON controller 58 is coupled to the wireless network interface unit 54 and is able to accept and process signals received by the wireless network interface unit 54 from a remote wireless access point. Because the operating system and the full protocol stack may not be available during power save mode, information may be transmitted to the AON functionality within, for example, the data link layer (e.g., within medium access control (MAC) frames, etc.). In at least one embodiment, for example, the beacon signal 42 of FIG. 3, having the services signal 40, is received and processed by the AON controller 58. Other signal formats may alternatively be used.

The AON display 60 is a display unit that may be used by the AON controller 58 to display network related information to a user during, for example, a power save mode of operation. In at least one embodiment, the AON display 60 is a smaller display than the main display 56 and consumes significantly less energy than the main display 56 when active. The AON display 60 may also be located in a position on the wireless client device 50 that is more easily accessible by the user than the main display 56 when not actively using the wireless user device 50. For example, if the wireless user device 50 is a laptop computer, the main display 56 may be on the inside of a clamshell cover of the computer, while the AON display is located on an outside surface of the laptop to facilitate easy viewing by a user without having to open the cover. Many alternative arrangements also exist. In at least one embodiment, the AON controller 58 uses the main display 56 (or a portion thereof) to display network related information to a user during a power save mode and a separate AON display 60 is not provided.

With reference to FIG. 4, during a power save mode of operation, the wireless network interface unit 54 may receive a services signal from a wireless access point that includes information relating to services that are available within an associated network. As described previously, the services signal may be part of a beacon signal that is regularly broadcast by the wireless access point to clients within a coverage region thereof. Other forms of services signal may alternatively be used. The wireless network interface unit 54 may then deliver the received services signal to the AON controller 58 which uses the information to display network services information to a user of the wireless client device 50 via, for example, AON display 60. If a beacon approach is used, the AON controller 58 may update the displayed services information each time a new beacon signal is received. A user of the wireless client device 50 may view the service information on the AON display 60 and make a decision as to whether it is desirable to fully activate the device 50. For example, the user may, by viewing the AON display 60, determine that relatively inexpensive Internet access services are available. The user may then decide to access an email account or perform other Internet related activities based thereon. It should be appreciated that the wireless client device 50 of FIG. 4 is merely an example of one type of client device that may be implemented in accordance with the principles of the present invention. Many alternative architectures also exist.

Figure 5:
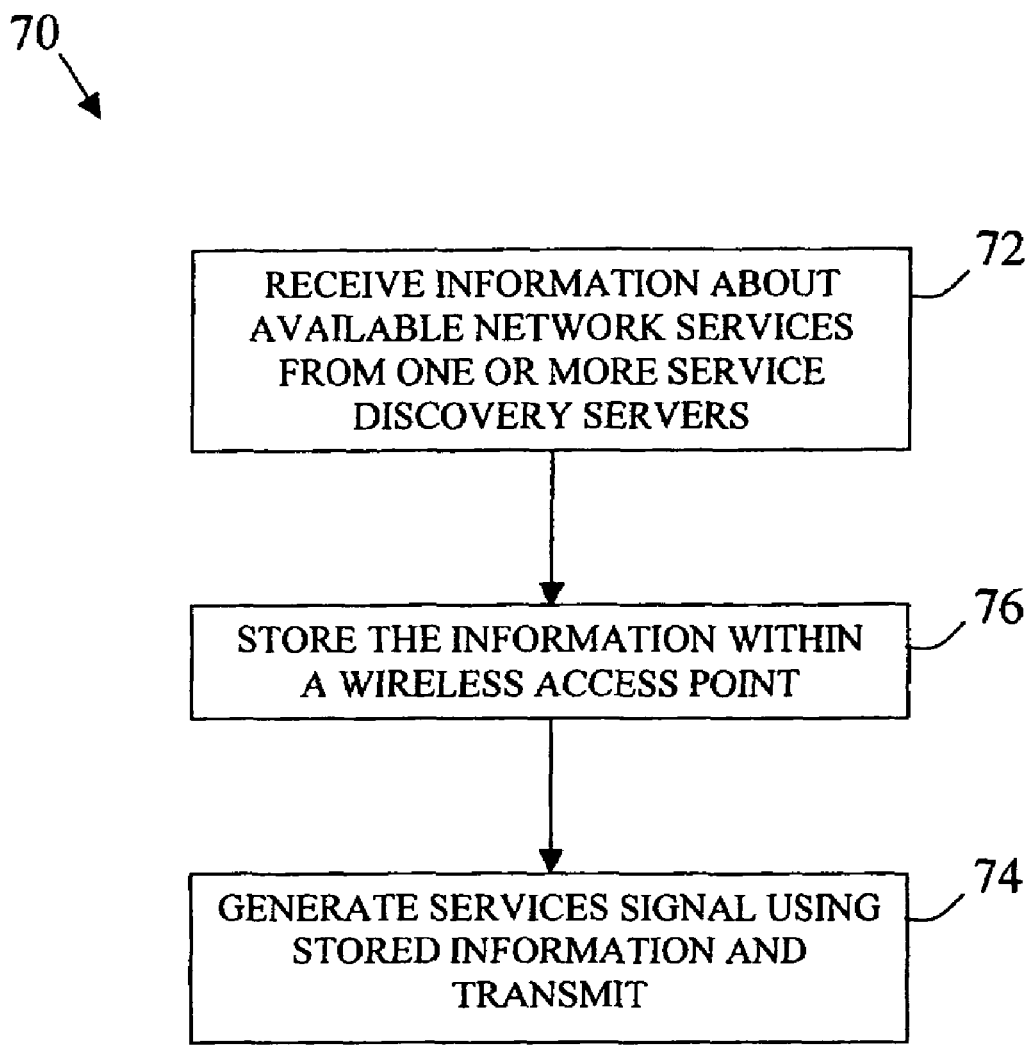
FIG. 5 is a flowchart illustrating an example method for delivering information about services available within a wireless network to one or more wireless client devices within the network in accordance with an embodiment of the present invention.

FIG. 5 is a flowchart illustrating an example method 70 for delivering information about services available within a wireless network to one or more wireless client devices within the network. The method 70 may be used within wireless networks following any of a wide range of different wireless networking and/or cellular standards. Information is first received from one or more service discovery servers within the network that describes services that are available within the network (block 72). The information may then be stored in a memory within a wireless access point in the network (block 74). A services signal having a predetermined signal format may then be generated using the stored information and the signal may be wirelessly transmitted within the wireless network (block 76). In one possible approach, the services signal is broadcast to client devices within a coverage region of the wireless access point as part of a beacon signal or other type of broadcast signal. In another approach, the services signal may be transmitted to a particular wireless client device in response to, for example, a request received from the device. Other techniques also exist. In at least one embodiment, the services information that is transmitted to a wireless client device (or to multiple wireless client devices) is in a format than may be read within the data link layer in the wireless client device. In this manner, the information may be displayed to a user of the client device even if the operating system of the device is not currently active (due to operation within, for example, a power saving mode). In at least one implementation, the service information is included within a medium access control (MAC) frame transmitted within a wireless network.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A wireless access point comprising:
a memory to store information relating to services available in an associated network;
a wireless transceiver to provide wireless communication with one or more wireless client devices; and
a controller to generate a services signal using service related information from said memory and to cause said wireless transceiver to transmit said services signal;
wherein said services signal is transmitted as part of a beacon signal transmitted by said wireless transceiver.

2. The wireless access point of claim 1, wherein:
said controller includes a service abstraction unit to parse service information received from a service discovery server and store said service information in said memory.

3. The wireless access point of claim 1, wherein:
said wireless access point is programmed for use within a wireless network that utilizes medium access control (MAC) frames, wherein said services signal is transmitted as part of a frame body of a MAC frame.

4. The wireless access point of claim 3, wherein:
said services signal is transmitted in one or more information elements within said frame body of said MAC frame, wherein said wireless access point is for use within a network following the IEEE 802.11 wireless standard and said one or more information elements includes one or more of the reserved information elements having ID numbers 32-255 within a frame body of an IEEE 802.11 management frame.

5. The wireless access point of claim 4, wherein:
said frame body of said MAC frame also includes an advertising interval that is being used to advertise a particular service.

6. The wireless access point of claim 1, wherein:
said services signal describes services using an extensible markup language (XML).

7. The wireless access point of claim 1, wherein:
said services signal describes services using a format that is readable within a data link layer of the associated network.

8. The wireless access point of claim 1, wherein:
said controller is programmed to generate said services signal in response to a request received from a wireless client device.

9. The wireless access point of claim 1, wherein:
said controller is programmed to broadcast services signals at fixed intervals.

10. A wireless access point, comprising:
a memory; and
a controller to receive information about services available within an associated network from at least one service discovery server and to store the information within the memory, wherein said controller includes a service abstraction unit to parse service information received from said at least one service discovery server and store said service information in said memory in a predetermined format, said service abstraction unit having interfaces to accept service discovery plug-ins.

11. The wireless access point of claim 10, wherein:
said controller is programmed to generate a services signal, using information from said memory, to be transmitted to one or more wireless client devices within the associated network.

12. The wireless access point of claim 11, wherein:
said services signal describes services available within the associated network in a format that is readable within a data link layer of the associated network.

13. The wireless access point of claim 11, wherein:
said services signal describes services using an extensible markup language (XML).

14. The wireless access point of claim 11, comprising:
a wireless transceiver to wirelessly transmit said services signal.

15. The wireless access point of claim 11, wherein:
said services signal is transmitted as part of a medium access control (MAC) frame.

16. A method comprising:
receiving information relating to services available within a network from one or more service discovery servers;
storing the information within a memory in a wireless access point;
generating a services signal to be wirelessly transmitted in the network, using information stored in the memory; and transmitting said services signal within an information field of a frame body of an IEEE 802.11 MAC frame to wireless client devices within a coverage area of the wireless access point, wherein said services signal is included within one or more of the reserved information elements having ID numbers 32-255 of said IEEE 802.11 MAC frame.

17. The method of claim 16, wherein:
said IEEE 802.11 MAC frame is a beacon frame.

18. The method of claim 16, wherein:
said services signal describes services using an extensible markup language (XML).

19. The method of claim 16, wherein:
said services signal describes services available within the associated network in a format that can be read within a data link layer of the network.

20. A system comprising:
a wireless access point including:
- a memory to store information relating to services available in an associated network;
- a wireless transceiver to provide wireless communication with one or more wireless client devices; and
- a controller to generate a services signal using information from said memory and to cause said wireless transceiver to transmit said services signal, wherein said controller includes a service abstraction unit to parse service information received from service discovery servers and store said service information in said memory in a predetermined format, said service abstraction unit having plug-in interfaces to accept service discovery plug-ins: and a portable computer to receive the services signal from said wireless transceiver and to display network service information to a user of the portable computer based thereon.

21. The system of claim 20, wherein:
said wireless access point is for use within a network following the IEEE 802.11 wireless standard; and
said wireless transceiver transmits said services signal in one or more of the reserved information elements having ID numbers 32-255 within a frame body of an IEEE 802.11 management frame.

* * * * *